US012572483B2

(12) United States Patent
Xu

(10) Patent No.: US 12,572,483 B2
(45) Date of Patent: Mar. 10, 2026

(54) MEMORY MANAGEMENT METHOD AND DEVICE, CHIP, AND TRAFFIC APPARATUS

(71) Applicant: Beijing SemiDrive Technology Ltd., Beijing (CN)

(72) Inventor: Xiaofeng Xu, Beijing (CN)

(73) Assignee: BEIJING SEMIDRIVE TECHNOLOGY LTD., Beijing (CN)

( * ) Notice: Subject to any disclaimer, the term of this patent is extended or adjusted under 35 U.S.C. 154(b) by 0 days.

(21) Appl. No.: 18/770,824

(22) Filed: Jul. 12, 2024

(65) Prior Publication Data

US 2025/0036580 A1 Jan. 30, 2025

(30) Foreign Application Priority Data

Jul. 25, 2023 (CN) ......................... 202310919253.8

(51) Int. Cl.
*G06F 13/16* (2006.01)
*G06F 9/54* (2006.01)
*G06F 15/78* (2006.01)

(52) U.S. Cl.
CPC .......... *G06F 13/1668* (2013.01); *G06F 9/544* (2013.01); *G06F 15/7828* (2013.01)

(58) Field of Classification Search
CPC ......... G06F 9/50; G06F 9/5016; G06F 9/5022
See application file for complete search history.

(56) References Cited

U.S. PATENT DOCUMENTS

| | | | |
|---|---|---|---|
| 8,370,605 B2 * | 2/2013 | Nejah | ................. G06F 9/44505 712/30 |
| 10,838,884 B1 * | 11/2020 | Magudilu Vijavaraj | .................... G06F 13/161 |
| 2016/0283438 A1 * | 9/2016 | Chen | ......................... G06F 15/80 |
| 2021/0034527 A1 * | 2/2021 | Klingauf | ............. G06F 12/0877 |
| 2022/0374279 A1 * | 11/2022 | Arora | .................... G06F 9/5011 |
| 2022/0414052 A1 * | 12/2022 | Li | ............................ G06F 15/80 |
| 2023/0096461 A1 * | 3/2023 | Rollet | ..................... G06F 9/545 718/107 |
| 2024/0362083 A1 * | 10/2024 | Wang | .................... G06F 9/5083 |

* cited by examiner

*Primary Examiner* — Edward J Dudek, Jr.
(74) *Attorney, Agent, or Firm* — ANOVA LAW GROUP, PLLC

(57) ABSTRACT

A memory management method includes receiving, by a first operating system, a memory scheduling request sent by at least one second operating system through an inter-core communication channel, determining, by the first operating system, a target memory priority of each second processor corresponding to the second operating system based on the memory scheduling request, and assigning, by the first operating system, a memory bandwidth to the second operating system based on the target memory priority of the second processor. The memory scheduling request is used to request a memory bandwidth required by the second operating system. Each operating system is configured to run on a hardware set of a system-on-chip (SoC).

20 Claims, 4 Drawing Sheets

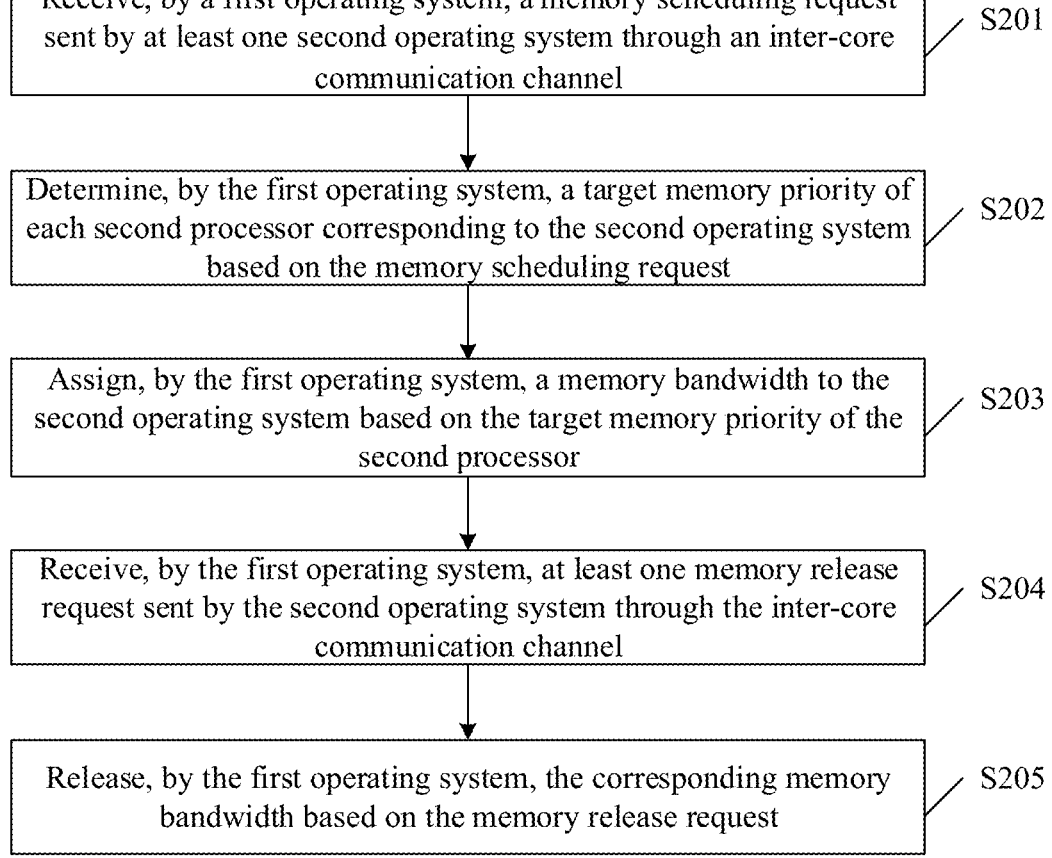

Receive, by a first operating system, a memory scheduling request sent by at least one second operating system through an inter-core communication channel                S201

Determine, by the first operating system, a target memory priority of each second processor corresponding to the second operating system based on the memory scheduling request                S202

Assign, by the first operating system, a memory bandwidth to the second operating system based on the target memory priority of the second processor                S203

Receive, by the first operating system, at least one memory release request sent by the second operating system through the inter-core communication channel                S204

Release, by the first operating system, the corresponding memory bandwidth based on the memory release request                S205

FIG. 3

MEMORY MANAGEMENT METHOD AND DEVICE, CHIP, AND TRAFFIC APPARATUS

CROSS-REFERENCE TO RELATED APPLICATION

The present disclosure claims priority to Chinese Patent Application No. 202310919253.8, filed on Jul. 25, 2023, the entire content of which is incorporated herein by reference.

TECHNICAL FIELD

The present disclosure generally relates to the computer technology field and, more particularly, to a memory management method, a memory management device, a chip, and a traffic apparatus.

BACKGROUND

A System on Chip (SoC) includes a multi-core heterogeneous chip composed of a plurality of single-core or multi-core processors of different types. The multi-core heterogeneous chip includes a plurality of hardware domains, an operating system is running in each hardware domain, and operating systems have memory bandwidth requirements. Memory bandwidth refers to the rate at which data can be transferred to and from the memory of a computer system within a given period of time. It is typically measured in bits per second (bps) or bytes per second, a higher memory bandwidth enables faster reading and writing of data. The operating system and the application programs running in it rely on sufficient memory bandwidth; otherwise, the operating system or the application programs may stutter or even crash. In a multi-hardware domain SOC, the total memory bandwidth is limited. Thus, it is desired to solve the problem of how to assign memory bandwidths to the operating systems to improve utilization of the memory bandwidth in the computer technology field, especially in the field of automotive-grade chips.

SUMMARY

Embodiments of the present disclosure provide a memory management method. The method includes receiving, by a first operating system, a memory scheduling request sent by at least one second operating system through an inter-core communication channel, determining, by the first operating system, a target memory priority of each second processor corresponding to the second operating system based on the memory scheduling request, and assigning, by the first operating system, a memory bandwidth to the second operating system based on the target memory priority of the second processor. The memory scheduling request is used to request a memory bandwidth required by the second operating system. Each operating system is configured to run on a hardware set of a system-on-chip (SoC).

Embodiments of the present disclosure provide a memory management running a first operating system, including a reception module, a determination module, and an assignment module. The reception module is configured to receive a memory scheduling request sent by at least one second operating system through an inter-core communication channel. The memory scheduling request is used to request the memory bandwidth required by the second operating system. The determination module is configured to determine the target memory priority of each second processor corresponding to the second operating system based on the memory scheduling request. The assignment module is configured to assign a memory bandwidth to the second operating system based on the target memory priority of the second processor. Each operating system is configured to run on a hardware set of a system-on-chip (SoC).

Embodiments of the present disclosure provide a chip, including a chip, one or more processors, and one or more memories. The one or more memories communicate with the one or more processors through the bus and store executable instructions that, when executed by the one or more processors, cause the one or more processors to receive, by a first operating system, a memory scheduling request sent by at least one second operating system through an inter-core communication channel, determine, by the first operating system, a target memory priority of each second processor corresponding to the second operating system based on the memory scheduling request, and assign, by the first operating system, a memory bandwidth to the second operating system based on the target memory priority of the second processor. The memory scheduling request is used to request a memory bandwidth required by the second operating system. Each operating system is configured to run on a hardware set of a system-on-chip (SoC).

The memory management method of embodiments of the present disclosure includes receiving, by the first operating system, the memory scheduling request sent by the at least one second operating system through the inter-core communication channel, determining the target memory priority of the second processor corresponding to each second operating system based on the memory scheduling request, and assigning the memory bandwidth for the second operating system based on the target memory priority of the second processor. Thus, the first operating system can determine the target memory priority of the second processor corresponding to the second operating system according to the memory scheduling request sent by the second operating system and assign the memory bandwidth for the second processor based on the target memory priority. Thus, the memory bandwidth can be assigned for the second processor according to the needs of the second processor, which avoids memory bandwidth waste and improves the utilization of the memory bandwidth.

BRIEF DESCRIPTION OF THE DRAWINGS

The following drawings are merely examples for illustrative purposes according to various disclosed embodiments and are not intended to limit the scope of the present disclosure.

FIG. 3 illustrates a schematic flowchart of a memory management method according to some embodiments of the present disclosure.

DETAILED DESCRIPTION OF THE EMBODIMENTS

Figure 1:
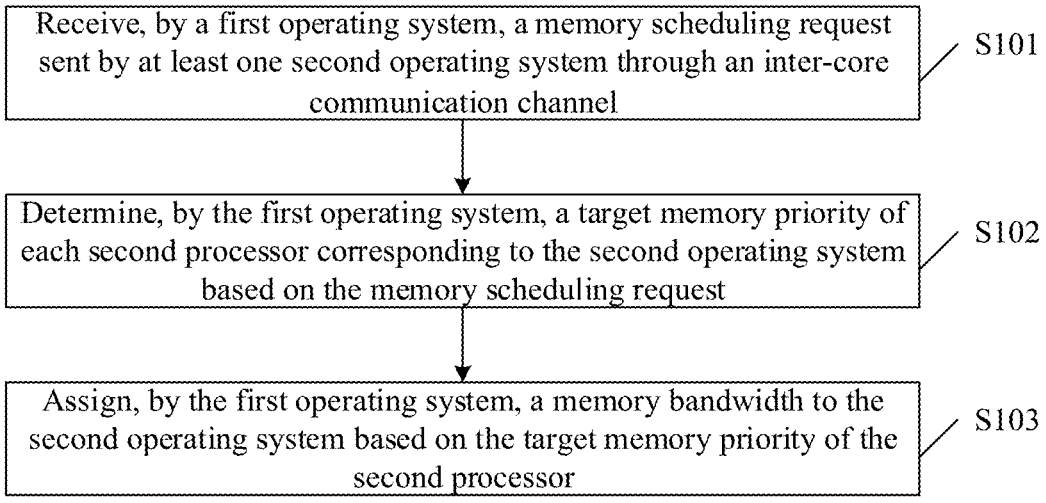
FIG. 1 illustrates a schematic flowchart of a memory management method according to some embodiments of the present disclosure.

To make the objectives, technical solutions, and advantages of the present disclosure clearer, the present disclosure is described in detail in connection with the accompanying drawings. Described embodiments are not considered to limit embodiments of the present disclosure. All other embodiments obtained by those of ordinary skill in the art without creative effort are within the scope of the present disclosure.

In the following description, the phrase "some embodiments" describes a subset of all possible embodiments. However, "some embodiments" can refer to the same or different subsets of all possible embodiments and can be combined when there is no conflict.

In the following description, the terms "first/second" are merely used to distinguish similar objects and do not represent a specific order of the objects. The specific sequence or order of "first/second" can be interchanged when allowed. Thus, described embodiments can be implemented in an order other than those illustrated or described here.

Unless otherwise defined, all technical and scientific terms used here have the same meaning as commonly understood by those skilled in the art of the present disclosure. The terminology used here is for the purpose of describing embodiments of the present disclosure and is not intended to limit the present disclosure.

In embodiments of the present disclosure, the sizes of the sequence numbers of the processes do not imply the order of execution. The execution order of the processes should be determined by their function and internal logic, and should not limit the implementation process of embodiments of the present disclosure.

Before embodiments of the present disclosure are further described in detail, the terms and terminology involved in embodiments of the present disclosure are described. The terms and terminology involved in embodiments of the present disclosure are suitable for the following explanation.

1) A multicore heterogeneous chip refers to a chip that integrates two or more processor cores within a single chip. Each processor core acts as an independent processor and runs instructions stored in the memory corresponding to the processor core. Multicore heterogeneous chips can have more combined advantages in performance, cost, power consumption, size, etc. Different architectures perform duties, respectively, and leverages unique advantages of the architectures.

The multicore heterogeneous chip of embodiments of the present disclosure can be applied to transportation equipment, including but not limited to balance vehicles, cars, buses, subways, trains, and airplanes.

2) A Hardware domain is a hardware set. The hardware set includes hardware resources, such as a processor core, an interrupt controller, a clock controller, and a memory. One or more processor cores are provided in the hardware set. One hardware domain runs at least one operating system. Except for the shared hardware resources, the operating system on one hardware domain does not share hardware resources with the operating system on another hardware domain.

In a System on Chip (SoC), CPU cores can be divided into large cores and small cores. The large cores can be suitable for running performance-intensive operating systems, while the small cores are suitable for running operating systems that are low-performance, high real-time performance, and safer. Different hardware domains can transmit information to each other through inter-core communication channels.

3) Inter-core communication is information communication between different hardware domains. The inter-core communication has more advantages than the communication between chips. For example, if the data does not need to be transmitted to the outside of the chip, the safety and the speed of the data transmission can be greatly improved. The inter-core communication can include a plurality of forms, such as a Mailbox mechanism suitable for transmitting the instructions and a shared memory mechanism suitable for sharing the data.

Mailbox is a mechanism or data structure configured for the communication between different processor cores. Mailbox can be configured to transmit messages and trigger events between different processors, cores, or hardware modules.

Mailbox can be used as a shared and bidirectional communication interface and include one or more registers used to store messages or control information. The sender can write the message into the register of the Mailbox, and the receiver can read the message and perform the corresponding processing. That is, the sender can control the receiver or instruct the receiver to perform the corresponding operation by writing messages or control information into the register of Mailbox.

In a semiconductor chip, Mailbox can be usually used for communication between processors, such as between multi-core processors, or a plurality of independent functional modules. Through the Mailbox mechanism, different processing units can operate collaboratively to share data, operate synchronously, and trigger events to realize more effective system collaboration and resource sharing.

The implementation of Mailbox may vary depending on chip architecture, communication protocol, or design requirements, which are used to realize reliable and effective communication and data exchange between processing units.

Memory sharing is a mechanism for sharing data between a plurality of processes (the processes can run on different processors), which allows different processes to access the same memory area to realize fast transmission and sharing of the data.

FIG. 1 illustrates a schematic flowchart of a memory management method according to some embodiments of the present disclosure. The method includes the following steps.

At S101, the first operating system receives a memory scheduling request sent by at least one second operating system through the inter-core communication channel.

In some embodiments, the memory scheduling request can be used to request the memory bandwidth required by the second operating system. The memory bandwidth requested by the second operating system can be a memory bandwidth exclusive to the second operating system or a shared memory bandwidth that is used by the first operating system and the second operating system. If the memory bandwidth requested by the second operating system is the shared memory bandwidth that can be used by the first operating system and the second operating system, the memory bandwidth can be assigned to one operating system of the first operating system and the second operating system.

In some embodiments, each operating system can be configured to run on a hardware set of the SoC. That is, each operating system can correspond to one hardware domain.

In some embodiments, the first operating system can be an operating system running on any hardware domain. The startup speed of the first operating system can also be faster than the startup speed of the second operating system. In this scene, the first operating system can be referred to as a small system, and the second operating system can be referred to as a large system. For example, the first operating system can be an RTOS system, while the second operating system can be an Android or Linux system.

In some embodiments, the first operating system can receive the memory scheduling request sent by the second operating system based on the Mailbox mechanism. The memory scheduling request can include a target memory priority desired by the second processors corresponding to the second operating system, and a size of the memory bandwidth desired by the second processors. In some embodiments, a mapping relationship between the memory priority and the memory bandwidth can be pre-configured in the SoC. Each memory priority corresponds to a memory bandwidth. The higher the memory priority is, the larger the corresponding memory bandwidth is. For example, the highest memory priority can be 1, the corresponding memory bandwidth can be 300 MB. The lowest memory priority can be 9, the corresponding memory bandwidth can be 20 MB. The memory bandwidth of 300 MB can be assigned to the processor with the memory priority of 1.

At S102, the first operating system determines the target memory priority of each second processor corresponding to the second operating system based on the memory scheduling request.

Figure 2:
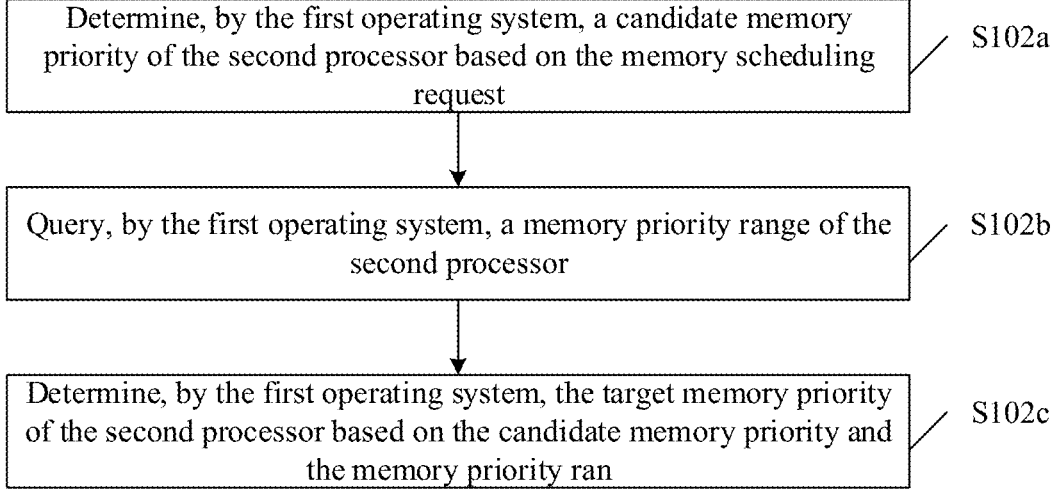
FIG. 2 illustrates a schematic flowchart of a first operating system determining a target memory priority of a second processor corresponding to each second operating system based on a memory scheduling request according to some embodiments of the present disclosure.

In some embodiments, as shown in FIG. 2, the specific implementation process of the first operating system determining the target memory priority of each second processor based on the memory scheduling request includes at least the following steps:

At S102a, the first operating system determines a candidate memory priority of the second processor based on the memory scheduling request.

In some embodiments, if the memory scheduling request carries the memory priority desired by the second processor, the first operating system can determine the memory priority carried in the memory scheduling request as the candidate memory priority of the second processor.

At S102b, the first operating system queries a memory priority range of the second processor.

In some embodiments, the memory priority range corresponding to the second processor can be preconfigured within the SoC. For example, the memory priority range corresponding to the second processor can be configured through a configuration file. The configuration file can be saved in a memory register.

In some embodiments, the configuration file can include at least the name of the hardware domain to which the second processor belongs, the serial number of the hardware domain to which the second processor belongs, the name of the second processor, and the memory priority range or memory priority of the second processor. For example, if the second processor is a Central Processing Unit (CPU), the name of the hardware domain to which the second processor belongs can be the intelligent cockpit domain, the serial number of the hardware domain to which the second processor belongs can be 1, and the memory priority range of the second processor can be 1 to 2. The memory priority can be 1, and the corresponding memory bandwidth can be 300

MB. The memory priority can be 2, and the corresponding memory bandwidth can be 200 MB.

In some embodiments, when the SoC starts, the first operating system can assign the memory bandwidth to the second processor according to the information in the configuration file. In some embodiments, if the configuration file includes the memory priority range of the second processor, a memory priority can be randomly selected from the memory priority range, and a memory bandwidth can be assigned to the second processor according to the selected memory priority. In some other embodiments, the memory bandwidth can be assigned to the second processor according to the size of the assignable memory bandwidth and the size of the memory bandwidth requested by each second processor. After receiving the memory scheduling request sent by the second operating system, the first operating system can re-assign the memory bandwidth to the second processor according to the memory scheduling request.

At S102c, the first operating system determines the target memory priority of the second processor based on the candidate memory priority and the memory priority range.

In some embodiments, if the candidate memory priority is within the memory priority range, the first operating system can determine the candidate memory priority as the target memory priority of the second processor. For example, if the memory priority range of the second processor is 1-2 and the candidate memory priority is 1, the first operating system determines the target memory priority of the second processor to be 1.

In some other embodiments, if the candidate memory priority is not within the memory priority range, the first operating system can determine the memory priority within the memory priority range having a smallest difference with the candidate memory priority as the target memory priority of the second processor. For example, if the memory priority range of the second processor is 3-4 and the candidate memory priority is 2, since the candidate memory priority is closer to 3 in the memory priority range, the first operating system can determine the target memory priority of the second processor to be 3.

In FIG. 2, for example, the second processor cannot pre-determine the memory priority range of the second processor, the processing process of the first operating system determining the target memory priority of the second processor is described. In some embodiments, the memory priority range corresponding to the second processor can be sent to the second operating system in advance. The second operating system can send the memory scheduling request according to the memory priority range corresponding to the second processor. The memory priority carried by the memory scheduling request can be within the memory priority range corresponding to the second processor. Thus, the first operating system can directly determine the memory priority carried in the memory scheduling request as the target memory priority.

In some embodiments, the first operating system can configure the target memory priority of the second processor in the memory register.

At S103, the first operating system assigns the memory bandwidth to the second operating system based on the target memory priority of the second processor.

Embodiments of the present disclosure provide a plurality of second operating systems. Each second operating system can correspond to one or more second processors.

In some embodiments, if the total memory bandwidth required by all the second processors is less than the assigned memory bandwidth, the first operating system can sequentially assign the memory bandwidth to each second processor according to the sequence of the target memory priority from high to low. For each second operating system, the total memory bandwidth of all the second processors corresponding to the second operating system can be determined as the memory bandwidth of the second operating system.

In some other embodiments, if the total memory bandwidth required by all the second processors is greater than the assigned memory bandwidth, the first operating system can adjust the first target memory priority of the second processor to a second target priority. The second target priority can be lower than the first target priority. Then, the memory bandwidth can be sequentially assigned to each second processor according to the sequence of the adjusted target memory priority from high to low. If the total memory bandwidth required by all the second processors is still greater than the assignable memory bandwidth after lowering the target memory priority of a second processor, the target memory priority of the one or more second processors can continue to be lowered.

For example, two second processors including second processor 1 and second processor 2 can request memory bandwidth assignment from the first operating system. The memory priority of second processor 1 can be 1, and the memory priority of 1 and second processor 2 can be 2. The memory bandwidth corresponding to the memory priority of 1 can be 300 MB, and the memory bandwidth corresponding to the memory priority of 2 can be 200 MB. The currently assignable memory bandwidth of the first operating system can be 400 MB. The first operating system can modify the memory priorities of second processor 1 and second processor 2. The memory bandwidth can be assigned to second processor 1 and second processor 2. The memory bandwidth can be assigned to second processor 1 and second processor 2 based on the modified memory priority. The first operating system can update the modified memory priority of second processor 1 in the memory register.

In some embodiments, the first operating system can configure the memory bandwidth of each second processor in each second operating system through the memory register.

The memory management method of embodiments of the present disclosure is described by taking an example that one or more second operating systems require the memory bandwidth assignment. In some embodiments, both the first operating system and the second operating system can require the assignment of the memory bandwidth. Thus, the first operating system can determine the target memory priority of the first processor corresponding to the first operating system. Then, according to the target memory priority of the second processor and the sequence of the target memory priority of the first processor from high to low, the first operating system can assign the memory bandwidth in sequence. For each second operating system, the sum of the bandwidths of all the second processors corresponding to the second operating system can be determined as the memory bandwidth of the second operating system.

The second processor of embodiments of the present disclosure can include a CPU, a Graphics Processing Unit (GPU), a Video Processing Unit (VPU), or a Camera Serial Interface (CSI) module. For different application scenarios, the second processor applied may vary. For example, for an application scenario of instrument display, the applied second processor can include a GPU, a CPU, and a DisplayPort (DP). For an application scenario of video playback, the applied second processor can include a GPU, a CPU, a VPU, and a DP.

In embodiments of the present disclosure, the required memory bandwidth can be assigned to the processor required by each application scenario. Compared with the related technology of the memory bandwidth with a fixed size being assigned to one operating system or one processor, in the memory management method of embodiments of the present disclosure, the memory bandwidth can be effectively assigned according to the needs of the processors. Thus, the utilization of memory bandwidth can be improved.

In embodiments of the present disclosure, if the first operating system is a small system with a fast startup speed, the first operating system with a small consumption in bandwidth can be configured to assign the memory bandwidth for the second operating system to quickly respond to the various application scenarios.

FIG. 3 illustrates a schematic flowchart of a memory management method according to some embodiments of the present disclosure. As shown in FIG. 3, the method includes the following steps.

At S201, the first operating system receives at least one memory scheduling request sent by the second operating system through an inter-core communication channel.

At S202, the first operating system determines the target memory priority of the second processor corresponding to each second operating system based on the memory scheduling request.

At S203, the first operating system assigns the memory bandwidth for the second operating system based on the target memory priority of the second processor.

At S204, the first operating system receives at least one memory release request sent by the second operating system through the inter-core communication channel.

In some embodiments, if the second operating system does not need to run a certain application, the second operating system can request to release the memory bandwidth corresponding to the application (which can also be referred to as an application scenario) by sending a memory release request to the first operating system.

In some embodiments, the memory release request can carry information such as the name of the processor and the size of the memory bandwidth corresponding to the processor.

At S205, the first operating system releases the corresponding memory bandwidth based on the memory release request.

In some embodiments, the first operating system can release the corresponding memory bandwidth according to the information carried in the memory release request. Compared with the related technology of assigning the memory bandwidth of the fixed size for the operating system or the processor, when the operating system or the processor of embodiments of the present disclosure does not need the memory bandwidth, the corresponding memory bandwidth can be released. Thus, the memory bandwidth released by the first operating system can be assigned to the operating system or the processor that requires the memory resources to use the memory bandwidth effectively.

Figure 4:
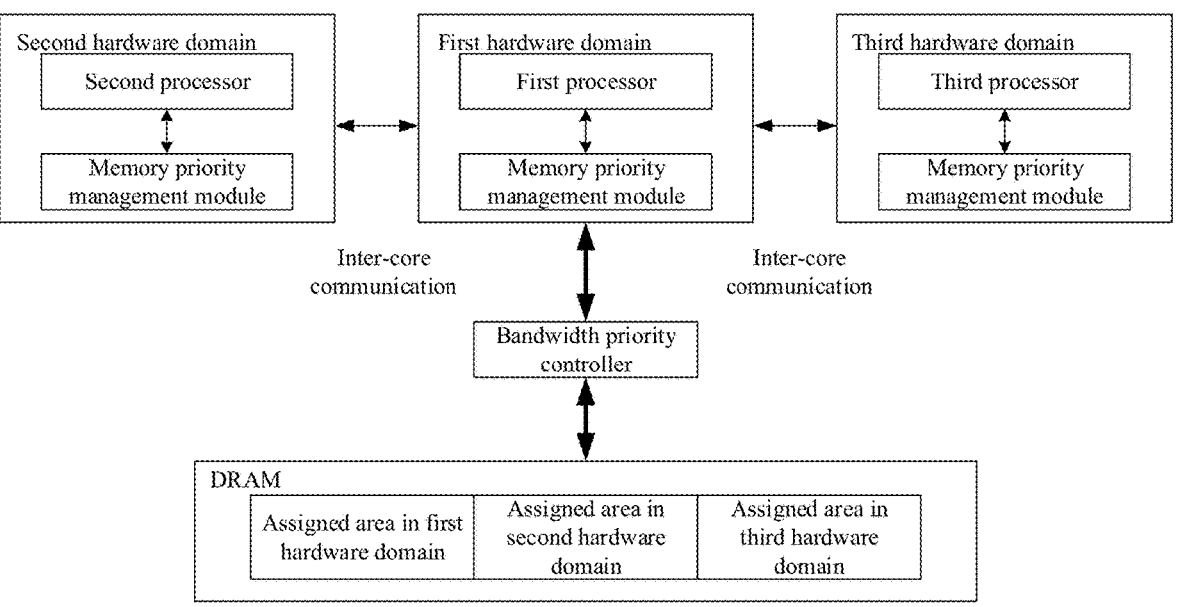
FIG. 4 illustrates a schematic diagram showing an application scene of a memory management method according to some embodiments of the present disclosure.

FIG. 4 illustrates a schematic diagram showing an application scene of a memory management method according to some embodiments of the present disclosure. As shown in FIG. 4, the SoC includes at least a first hardware domain, a second hardware domain, and a third hardware domain. When the first operating system is running in the first hardware domain, and the second hardware domain and the third hardware domain require the memory bandwidth, the memory scheduling request can be sent to the first hardware domain through the inter-core communication mechanism (also referred to as the inter-core communication channel). The memory bandwidth can be from the dynamic random access memory (DRAM) connected to the SoC externally. In some embodiments, the second hardware domain and the third hardware domain each can include a memory priority management module. The memory priority management module of each hardware domain can be configured to manage the memory bandwidth of the hardware domain where the memory priority management module is. For example, the memory priority management module can send the memory scheduling request to the first hardware domain to request to assign the memory bandwidths to the second processor of the second hardware domain or the third processor of the third hardware domain. The first hardware domain can also include the memory priority management module. The memory priority management module of the first hardware domain can be configured to receive the memory scheduling request or memory release request sent by another hardware domain, assign or release the memory bandwidth for the second hardware domain or the third hardwood domain according to the received memory scheduling request or memory release request. The memory priority management module of the first hardware domain can be further configured to manage the memory of the first processor in the first hardware domain. In some embodiments, the memory priority management module of the first hardware domain can trigger the bandwidth priority controller to assign or release the memory bandwidth for the second hardware domain or third hardware domain.

Figure 5:
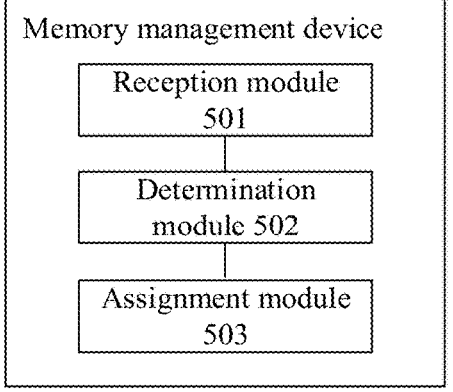
FIG. 5 illustrates a schematic structural diagram of a memory management device according to some embodiments of the present disclosure.

Embodiments of the present disclosure further provide a memory management device. The memory management device runs the first operating system. FIG. 5 illustrates a schematic structural diagram of the memory management device according to some embodiments of the present disclosure. As shown in FIG. 5, the device includes a reception module 501, a determination module 502, and an assignment module 503.

The reception module 501 can be configured to receive the memory scheduling request sent by the at least one second operating system. The memory scheduling request is used to request to obtain the memory bandwidth required by the second operating system.

The determination module 502 can be configured to determine the target memory priority of the second processor corresponding to each second operating system.

The assignment module 503 can be configured to assign the memory bandwidth to the second operating system based on the target memory priority of the second processor.

Each operating system can be configured as a hardware set running on the SoC.

In some embodiments, the determination module 502 can be configured to determine the candidate memory priority of the second processor according to the memory scheduling request, query the memory priority range of the second processor, and determine the target memory priority of the second processor based on the candidate memory priority.

In some embodiments, if the candidate memory priority is within the memory priority range, the determination module 502 can be configured to determine the candidate memory priority as the target memory priority of the second processor. If the candidate memory priority is not within the memory priority range, the determination module 502 can be configured to determine the memory priority having a smallest difference with the candidate memory priority as the target memory priority of the second processor.

In some embodiments, the memory scheduling request sent by the second operating system can correspond to at least two second processors. The assignment module 503 can be configured to assign the memory bandwidth for each second processor in sequence according to the sequence of the target memory priority from high to low.

For each second operating system, the assignment module 503 can be configured to determine the sum of the memory bandwidths of all the second processors corresponding to the second operating system as the memory bandwidth of the second operating system.

In some embodiments, if the required memory bandwidth is greater than the assignable memory bandwidth, the assignment module can be configured to adjust the first target memory priority of the second processor to the second target memory priority and assign the memory bandwidth for each second processor according to the order of the adjusted target with the sequence of the target memory priority from high to low. For each second operating system, the assignment module 503 can be configured to determine the sum of the memory bandwidths of all the second processors corresponding to the second operating system as the memory bandwidth of the second operating system. The second target priority can be lower than the first target priority.

In some embodiments, the assignment module 503 can be configured to configure the memory bandwidth for each second operating system through the memory register.

In some embodiments, the device can also include a configuration module (not shown in FIG. 5) configured to configure the memory priority of the second processor in the memory register as the corresponding target memory priority.

In some embodiments, the device can also include a processing module (not shown in FIG. 5) configured to receive at least one memory release request sent by the second operating system through the inter-core communication channel and release the corresponding memory bandwidth based on the memory release request.

In some embodiments, the determination module 502 can be further configured to determine the target memory priority of the first processor corresponding to the first operating system.

In some embodiments, the assignment module 503 can be configured to assign the memory bandwidth in sequence according to the target memory priority of the second processor and the target memory priority of the first processor from high to low.

For each second operating system, the assignment module 503 can be configured to determine the sum of the memory bandwidths of all the second processors corresponding to the second operating system as the memory bandwidth of the second operating system.

In some embodiments, the determination module 502 can be further configured to determine the sum of the memory bandwidths of all the first processors corresponding to the first operating system as the memory bandwidth of the first operating system.

Figure 6:
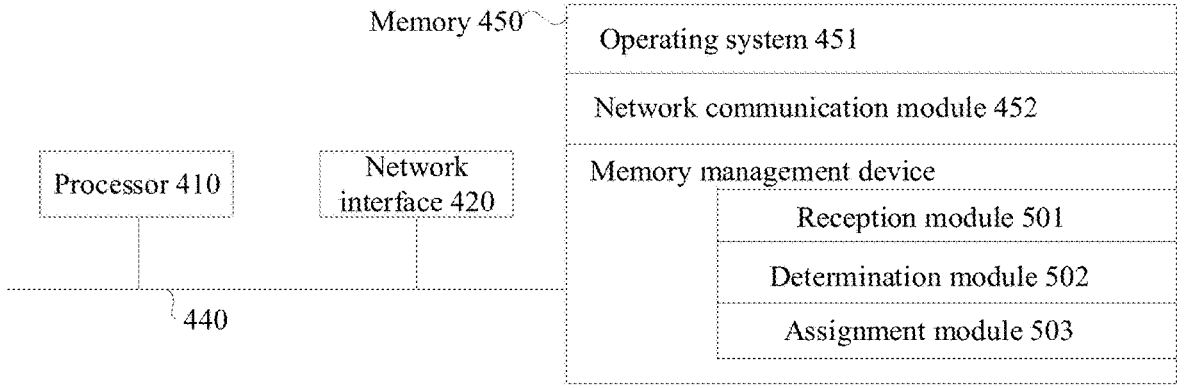
FIG. 6 illustrates a schematic structural diagram of a chip according to some embodiments of the present disclosure.

Embodiments of the present disclosure further provide a chip. FIG. 6 illustrates a schematic structural diagram of the chip according to some embodiments of the present disclosure. As shown in FIG. 6, the chip includes a processor 410, a memory 450, and a bus 440. Modules in the chip can be coupled with each other through the bus 440. The bus 440 can be used to realize the communicative connection between the modules. The bus 440 can include a data bus, a power supply bus, a control bus, and a status signal bus. For clarity, various buses in FIG. 6 are marked as the bus 440. As shown in FIG. 6, another embodiment of the present disclosure the chip can include a processor 410 and a bus 440, while a memory 450 is set outside the chip.

The processor 410 can include a general-purpose processor, a digital signal processor (DSP), or other programmable logic devices, discrete gate or transistor logic devices, and discrete hardware models having signal processing capabilities. The general-purpose processor can include a microprocessor or any conventional processor.

The memory 450 can store executable instructions used to implement the memory management method of embodiments of the present disclosure. The memory management method is realized by the reception module 501, the determination module 502, and the assignment module 503 of the memory management device in FIG. 5. The memory 450 can be set inside the chip or outside the chip. The memory 450 can be Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), or non-volatile memories such as Phase Change Memory (PCM), Magnetic Random Access Memory (MRAM), Resistive Random Access Memory (RRAM).

In some embodiments, the memory 450 can store data to support various operations. Examples of the data can include programs, modules, data structures, or subsets or supersets thereof.

In some embodiments, the chip may also include an operating system 451.

The operating system 451 can include system programs used to handle various basic system services and perform hardware-related tasks, such as framework layers, core library layers, driver layers, etc., which are used to implement various basic services and handle hardware-based tasks.

The network communication module 452 can reach other computation apparatuses via one or more (wired or wireless) network interfaces 420. Exemplary network interfaces 420 can include Bluetooth, WiFi, and Universal Serial Bus (USB).

Embodiments of the present disclosure can further provide a component in a traffic apparatus. The component can include a chip. The chip can be configured to implement the memory management method of the vehicle.

In some embodiments, the component can include a circuit board-level component, a vehicle electrical system-level component, or a vehicle assembly component. For example, the component can include an engine, a chassis, a body, and an electrical/electronic apparatus of the vehicle. The electrical/electronic apparatus of the vehicle can include headlights for lighting, a management apparatus for controlling the engine, a central control apparatus for receiving broadcasts, navigation, music, entertainment, etc.

Embodiments of the present disclosure can further provide a traffic apparatus. The traffic apparatus can include the chip. The chip can be configured to implement the memory management method. The chip can include a multi-core heterogeneous chip. The transportation apparatus can include but is not limited to balance cars, cars, buses, trains, or airplanes.

Embodiments of the present disclosure can further provide a computer-readable storage medium storing executable instructions. When the executable instructions are executed by one or more processors, the one or more processors can be triggered to implement the memory management method of embodiments of the present disclosure, for example, the memory management method shown in FIG. 1 to FIG. 4.

In some embodiments, the computer-readable storage medium can be a ferroelectric RAM (FRAM), a read-only memory (ROM), a programmable read-only memory (PROM), an erasable programmable read-only memory (EPROM), an electrically erasable programmable read-only memory (EEPROM), a flash memory, a magnetic surface storage, optical discs, CD-ROMs, or a combination thereof.

In some embodiments, the executable instructions can be in the form of programs, software, software modules, scripts, or codes, which are written in any form of programming language (including compiled or interpreted languages, or declarative or procedural languages), and can be deployed in any form, including as independent programs or as modules, models, subroutines, or other units suitable for use in a computation environment.

For example, the executable instructions can be deployed on one computation apparatus for execution or a plurality of computation apparatuses in one place for execution. The executable instructions can be deployed on a plurality of computation apparatuses distributed at a plurality of places and connected to each other through the communication network.

Embodiments of the present disclosure can provide a computer program product. The computer program product can include computer programs/instructions. When the computer programs/instructions are performed by the processor, the memory management method of embodiments of the present disclosure can be implemented.

The above are merely embodiments of the present disclosure and are not intended to limit the scope of the present disclosure. Any modifications, equivalent replacements, and improvements made within the spirit and scope of the present disclosure are included within the scope of the present disclosure.

What is claimed is:

1. A memory management method comprising:
   receiving, by a first operating system to which a first processor corresponds, a memory scheduling request sent by a second operating system through an inter-core communication channel, the memory scheduling request being used to request a memory bandwidth required by the second operating system;
   determining, by the first operating system, a target memory priority of a second processor corresponding to the second operating system based on the memory scheduling request; and
   assigning, by the first operating system, the memory bandwidth to the second operating system based on the target memory priority of the second processor;
   wherein each operating system is configured to run on a hardware set of a system-on-chip (SoC).

2. The method according to claim 1, wherein determining, by the first operating system, the target memory priority of the second processor corresponding to the second operating system based on the memory scheduling request includes:
   determining, by the first operating system, a candidate memory priority of the second processor based on the memory scheduling request;
   querying, by the first operating system, a memory priority range of the second processor; and determining, by the first operating system, the target memory priority of the second processor based on the candidate memory priority and the memory priority range.

3. The method according to claim 2, wherein determining, by the first operating system, the target memory priority of the second processor based on the candidate memory priority and the memory priority range includes:

in response to the candidate memory priority being in the memory priority range, determining, by the first operating system, the candidate memory priority as the target memory priority of the second processor; and in response to the candidate memory priority being out of the memory priority range, determining, by the first operating system, a memory priority of the memory priority range having a smallest difference with the candidate memory priority as the target memory priority of the second processor.

4. The method according to claim 1, wherein assigning, by the first operating system, the memory bandwidth to the second operating system based on the target memory priority of the second processor includes:

in response to the memory scheduling request sent by the second operating system corresponding to at least two second processors, assigning a memory bandwidth to each second processor in sequence according to a sequence of the memory priority from high to low; and for each second operating system, determining a sum of memory bandwidths of all second processors corresponding to the second operating system as the memory bandwidth of the second operating system.

5. The method according to claim 1, wherein assigning, by the first operating system, the memory bandwidth to the second operating system based on the target memory priority of the second processor includes:

in response to the required memory bandwidth being greater than an assignable bandwidth, adjusting, by the first operating system, a first target memory priority of the second processor to a second target priority;

assigning a memory bandwidth for each second processor according to a sequence of the adjusted second target priority from high to low; and for each second operating system, determining a sum of memory bandwidths of all the second processors corresponding to the second operating system as the memory bandwidth of the second operating system;

wherein the second target priority is lower than the first target memory priority.

6. The method according to claim 5, wherein assigning, by the first operating system, the memory bandwidth to the second operating system based on the target memory priority of the second processor includes:

configuring, by the first operating system, the memory bandwidth of each second operating system through a memory register.

7. The method according to claim 6, further comprising:

configuring, by the first operating system, the target memory priority of the second processor in the memory register.

8. The method according to claim 5, further comprising:

receiving, by the first operating system, a memory release request sent by the second operating system through the inter-core communication channel; and releasing, by the first operating system, the corresponding memory bandwidth based on the memory release request.

9. The method according to claim 5, further comprising:

determining, by the first operating system, a target memory priority of the first processor corresponding to the first operating system.

10. The method according to claim 9, wherein assigning, by the first operating system, the memory bandwidth for the second operating system based on the target memory priority of the second processor includes:

assigning, by the first operating system, the memory bandwidth in a sequence according to a sequence of the target memory priority of the second processor and the target memory priority of the first processor from high to low; and for each second operating system, determining a sum of the memory bandwidths of all the second processors corresponding to the second operating system as the memory bandwidth of the second operating system.

11. The method according to claim 10, wherein the first processor includes a plurality of first processors, and the method further comprising:

determining, by the first operating system, a sum of memory bandwidths of all the first processors corresponding to the first operating system as the memory bandwidth of the first operating system.

12. A memory management running a first operating system comprising:

a reception module configured to receive a memory scheduling request sent by a second operating system through an inter-core communication channel, the memory scheduling request being used to request a memory bandwidth required by the second operating system;

a determination module configured to determine a target memory priority of a second processor corresponding to the second operating system based on the memory scheduling request; and an assignment module configured to assign the memory bandwidth to the second operating system based on the target memory priority of the second processor;

wherein each operating system is configured to run on a hardware set of a system-on-chip (SoC).

13. A chip comprising:

a bus;

one or more processors; and one or more memories communicating with the one or more processors through the bus and storing executable instructions that, when executed by the one or more processors, cause the one or more processors to:

receive, by a first operating system to which a first processor corresponds, a memory scheduling request sent by a second operating system through an inter-core communication channel, the memory scheduling request being used to request a memory bandwidth required by the second operating system;

determine, by the first operating system, a target memory priority of a second processor corresponding to the second operating system based on the memory scheduling request; and assign, by the first operating system, the memory bandwidth to the second operating system based on the target memory priority of the second processor;

wherein each operating system is configured to run on a hardware set of a system-on-chip (SoC).

14. The chip according to claim 13, wherein the one or more processors are configured to:

determine, by the first operating system, a candidate memory priority of the second processor based on the memory scheduling request;

query, by the first operating system, a memory priority range of the second processor; and determine, by the first operating system, the target memory priority of the second processor based on the candidate memory priority and the memory priority range.

15. The device according to claim 14, wherein the one or more processors are further configured to:

in response to the candidate memory priority being in the memory priority range, determine, by the first operating system, the candidate memory priority as the target memory priority of the second processor; and in response to the candidate memory priority being out of the memory priority range, determine, by the first operating system, a memory priority of the memory priority range having a smallest difference with the candidate memory priority as the target memory priority of the second processor.

16. The chip according to claim 13, wherein the one or more processors are further configured to:

in response to the memory scheduling request sent by the second operating system corresponding to at least two second processors, assign a memory bandwidth to each second processor in sequence according to a sequence of the memory priority from high to low; and for each second operating system, determine a sum of memory bandwidths of all second processors corresponding to the second operating system as the memory bandwidth of the second operating system.

17. The chip according to claim 13, wherein the one or more processors are configured to:

in response to the required memory bandwidth being greater than an assignable bandwidth, adjust, by the first operating system, a first target memory priority of a second processor to a second target priority;

assign a memory bandwidth for each second processor according to a sequence of the adjusted second target priority from high to low; and for the second operating system, determine a sum of memory bandwidths of all the second processors corresponding to the second operating system as the memory bandwidth of the second operating system;

wherein the second target priority is lower than the first target memory priority.

18. The chip according to claim 17, wherein the one or more processors are further configured to:

configure, by the first operating system, the memory bandwidth of the second operating system through a memory register.

19. The chip according to claim 18, wherein the one or more processors are further configured to:

configure, by the first operating system, the memory priority of the second processor in the memory register.

20. The chip according to claim 17, wherein the one or more processors are further configured to:

receive, by the first operating system, a memory release request sent by the second operating system through the inter-core communication channel; and release, by the first operating system, the corresponding memory bandwidth based on the memory release request.

* * * * *